United States Patent
Shigihara et al.

[11] Patent Number: 6,094,815
[45] Date of Patent: Aug. 1, 2000

[54] METHOD OF MANUFACTURING ROTOR FOR A VANE COMPRESSOR

[75] Inventors: Hidekatsu Shigihara, Higashimatsuyama; Mitsuya Ono, Kawagoe, both of Japan

[73] Assignee: Zexel Corporation, Tokyo, Japan

[21] Appl. No.: 09/248,645

[22] Filed: Feb. 11, 1999

[30] Foreign Application Priority Data

Feb. 16, 1998 [JP] Japan .................................. 10-050171

[51] Int. Cl.$^7$ ............................................ B23P 15/00
[52] U.S. Cl. ..................... 29/888.025; 29/888.02
[58] Field of Search ........................... 29/888.2, 888.025, 29/527.4, 527.6, 557; 72/352, 356

[56] References Cited

U.S. PATENT DOCUMENTS 5,046,244  9/1991  Anreiter .............................. 29/888.02

Primary Examiner—Irene Cuda
Attorney, Agent, or Firm—Frishauf, Holtz, Goodman, Langer & Chick, P.C.

[57] ABSTRACT

There is provided a method of manufacturing a rotor, which is capable of manufacturing a sufficiently high-strength and well-finished rotor at a reasonable price. A continuous cast rod is out into a billet having a predetermined length. The billet is heated and then fitted in a die assembly. A plurality of vane slits and a shaft hole are formed in the billet fitted in the die assembly, by the use of a press.

6 Claims, 5 Drawing Sheets

- CONTINUOUS CAST ROD — 100
- S1: CUT BAR INTO BILLET — 101
- S2: COAT BILLET WITH LUPRICANT — 101
- S3: HEAT BILLET
- S4: FORGE BILLET — 73, 74, 70
- S5: REMOVE PADS — 72, 75, 70, 71
- S6: CARRY OUT FINISH CUTTING — 72, 70
- S7: PRESS-FIT SHAFT — 110, 70
- S8: POLISH GROOVE
- ASSEMBLE — 110, 70, 71

METHOD OF MANUFACTURING ROTOR FOR A VANE COMPRESSOR

BACKGROUND OF THE INVENTION

1. Field of the Invention

This invention relates to a method of manufacturing a rotor for a vane rotary compressor.

2. Description of the Prior Art

Conventionally, a rotor is manufactured by cutting a rotor material formed with vane slits, which is made by extruding aluminum powder.

More specifically, a billet is formed by subjecting an aluminum alloy powder to hot press, and the billet is heated to a temperature within a range of 350 to 450° C. and fitted in a die heated to a temperature within a range of 300 to 400° C., followed by shaping the billet into a rotor material by press. At this time point, the rotor material has only vane slits formed therein during the extrusion process. Thereafter, the rotor material is out to a predetermined length, and then a shaft hole is machined through a central portion of the rotor material, and oil grooves are formed on out surfaces of the same by end milling. Subsequently, a shaft is press-fitted in the shaft hole, and the grooves are subjected to finish machining.

In the above method, however, the rotor material is liable to be distorted or warped, so that it is difficult to ensure perpendicularity of each of the vane slits with respect to the end faces of the rotor. As a result, it is required to carry out an additional machining for achieving the perpendicularity.

Further, since the die and the material are not lubricated, a peripheral surface of the material galls or burns due to friction between the die and the material, which results in degraded accuracy of finishing. Moreover, it is required to carry out an additional operation for cutting the oil grooves after the rotor material is shaped, which leads to an increase in manufacturing costs of the rotor.

SUMMARY OF THE INVENTION

It is an object of the invention to provide a method of manufacturing a sufficiently strong and accurately finished rotor for a vane compressor at a reasonable price.

To attain the above object, the present invention provides a method of manufacturing a rotor for a vane compressor, comprising the steps of:

cutting a continuous cast rod into a billet having a predetermined length;

heating the billet and then fitting the same in a die assembly; and forming a plurality of vane slits and a shaft hole in the billet fitted in the die assembly, by the use of a press.

According to this method of manufacturing a rotor, the billet obtained by cutting the continuous cast rod to the predetermined length is pressed by high pressure by the use of the press, whereby the vane slits and the shaft hole are formed in the billet at one time. Therefore, differently from a conventional extrusion method, the method of the invention makes it possible to prevent the billet from being distorted or warped.

Preferably, oil grooves are formed on end faces of the billet simultaneously when the vane slits and the shaft hole are formed. In this case, pads are formed for the vane slits and the shaft hole, respectively, but not for the oil grooves.

According to this preferred embodiment, since the oil grooves are formed on the end faces of the billet simultaneously when the vane slits and the shaft hole are formed by the use of the press, it is possible to dispense with a cutting process for machining the oil grooves.

Preferably, the billet has surfaces thereof coated with a lubricant after the billet is cut off from the continuous cast rod.

According to this preferred embodiment, since coating of the lubricant is formed on the whole surfaces of the billet, it is possible to reduce friction which occurs between the die and the billet during forging of the billet, to thereby prevent the surfaces of the billet from being burned.

Preferably, the billet is heated to approximately 400° C.

More preferably, the die assembly is heated to approximately 200 to 300° C.

Further preferably, the continuous cast rod is made of aluminum alloy containing 10 to 20 wt % of Si, 4 to 5 wt % of Cu, and 0.4 to 0.7 wt % of Mg.

The above and other objects, features and advantages of the present invention will become more apparent from the following detailed description taken in conjunction with the accompanying drawings.

DETAILED DESCRIPTION OF THE PREFERRED EMBODIMENT

The invention will now be described in detail with reference to drawings showing a preferred embodiment thereof.

Figure 1:
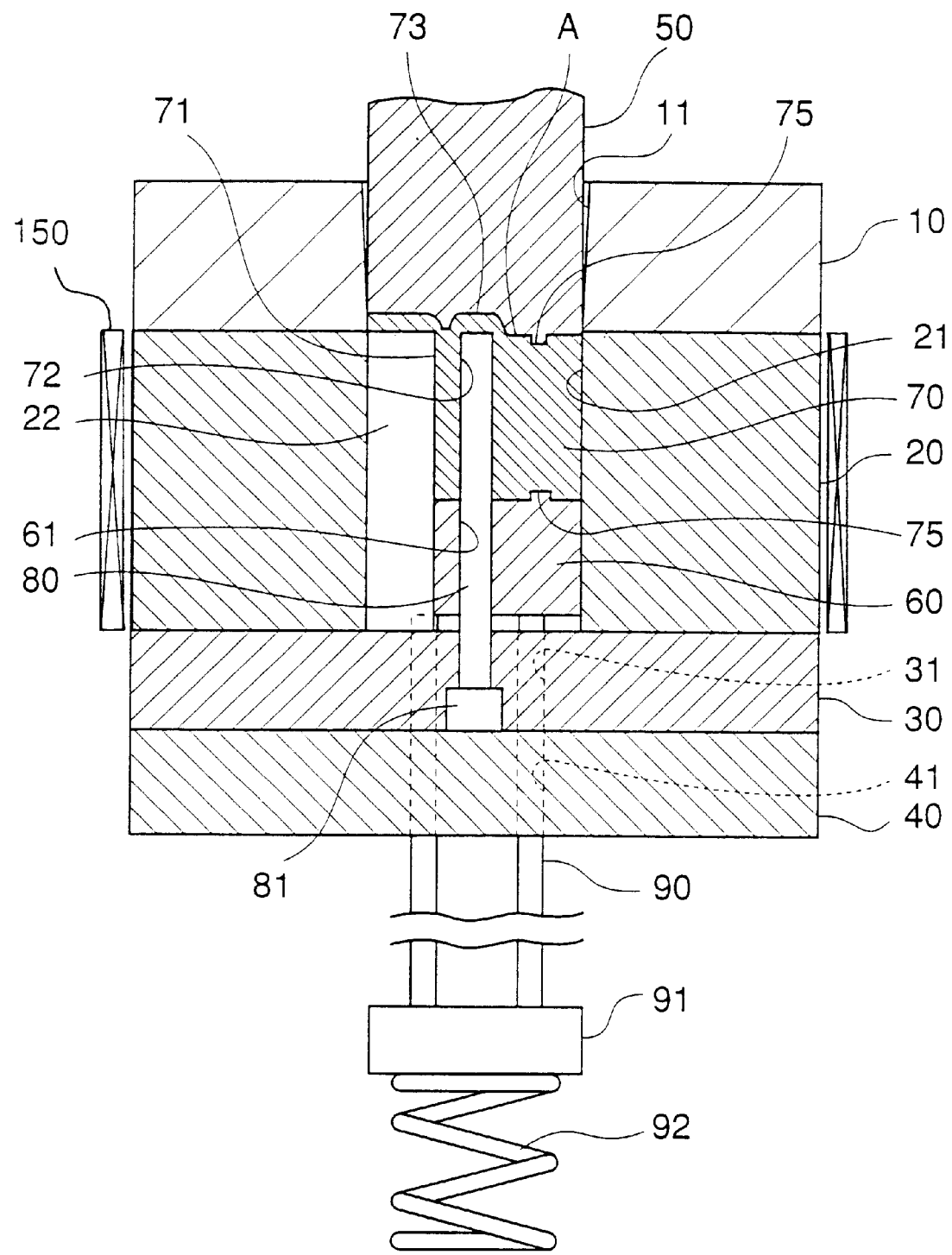
FIG. 1 is a sectional view of a die assembly employed in a method of manufacturing a rotor, according to the invention.
Figure 2:
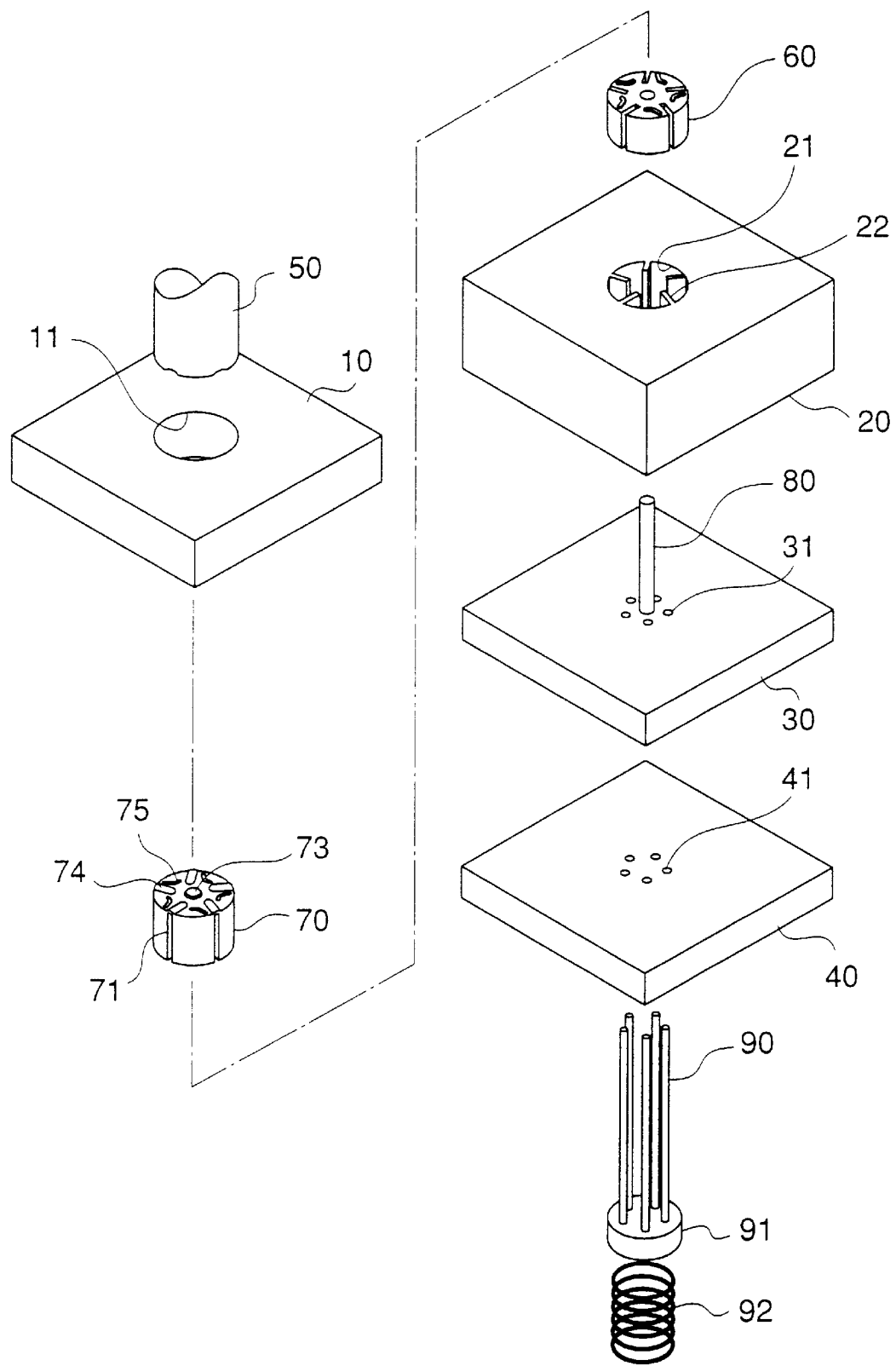
FIG. 2 is an exploded perspective view of the FIG. 1 die assembly.

Referring first to FIGS. 1 and 2, there is shown a die assembly for use in manufacturing a rotor by a method according to the present invention. FIG. 1 shows the die assembly in section, while FIG. 2 shows the same in exploded perspective view.

The die assembly is comprised of an upper die 10, a lower die 20, a spacer block 30, a bottom plate 40, and upper and lower punches 50, 60.

The upper die 10 is formed therethrough with a through hole 11 in which the upper punch 50 is fitted. The through hole 11 is in the form of a truncated cone which increases in diameter toward an upper opening thereof, so as to allow the upper punch 50 to be fitted therein easily.

The lower die 20 has a through hole 21 formed therethrough at a location corresponding to the through hole 11 of the upper die 10. The inner peripheral wall of the through hole 21 has five fins 22 formed at circumferentially equal intervals, which are used for forming vane grooves 71. The through hole 21 is formed to have an inner diameter equal to an outer diameter of a rotor material 70.

The lower die 20 has a coil heater 150 arranged therearound for heating the lower die 20 to a predetermined temperature (approximately 200 to 300° C.).

The upper punch 50 is connected to a press, not shown, such as a hydraulic press, and urged downward by the same.

Fitted vertically through a central portion of the lower punch 60 and projected upward from the same is a long cylindrical punch 80 for forming a shaft hole 72 through the rotor material 70.

The punch 80 has a lower end thereof formed with a flanged portion 81 which is fitted in a counter bore formed in the spacer block 30. The flanged portion 81 is fixedly sandwiched between the spacer block 30 and the bottom plate 40.

Ejector pins 90 each extending upward through a corresponding one of through holes 31 formed through the spacer block 30 and a corresponding one of through holes 41 formed through the bottom plate 40 are connected to a spring 92 by an ejector plate 91. The spring 92 always urges the lower punch 60 upward by its elastic force via the ejector pins 90.

Figure 3:
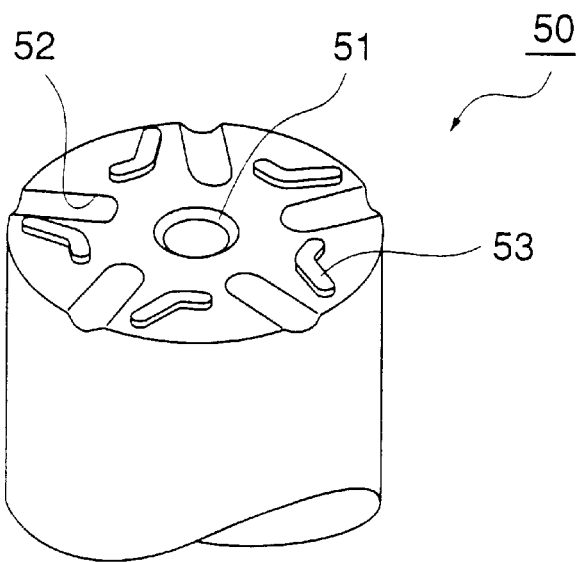
FIG. 3 is a perspective view of an upper punch.

FIG. 3 shows the upper punch in perspective view.

At a center of an end face of the upper punch 50, there is formed a circular recess 51 for forming a pad 73 at a center of one end face of the rotor material 70 at a location corresponding to the shaft hole 72.

Further, on the end face of the upper punch 50, there are formed five radial recesses 52 for forming pads 74 on the one end face of the rotor material 70 at locations corresponding respectively to vane slits 71.

Still further, formed between the recesses 52 are five protrusions 53 for forming oil grooves 75 on the one end face of the rotor material 70.

Figure 4:
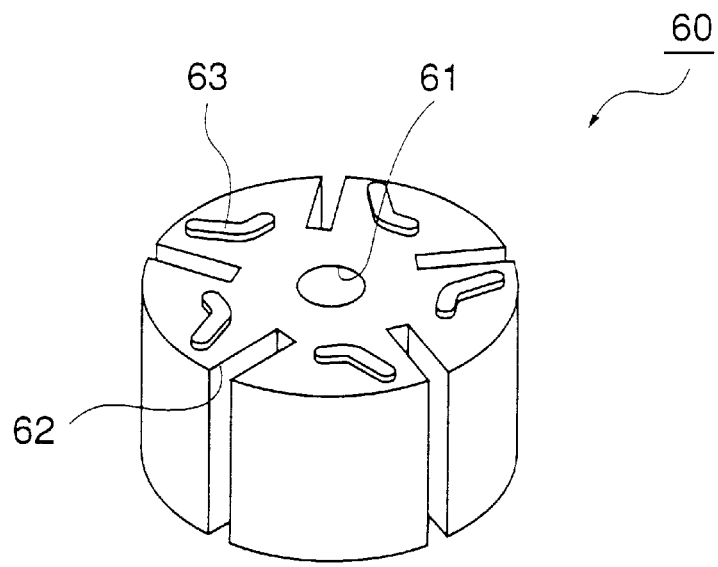
FIG. 4 is a perspective view of a lower punch.

FIG. 4 shows the lower punch in perspective view.

The lower punch 60 has a central portion thereof formed with a through hole 61 through which the punch 80 is fitted.

Further, the lower punch 60 is formed with five grooves 62 extending axially therethrough in each of which a corresponding one of the fins 22 can be fitted. On an end face of the lower punch 60, there are five projections 63 for forming oil grooves 75 on the other end face of the rotor material 70.

Figure 5:
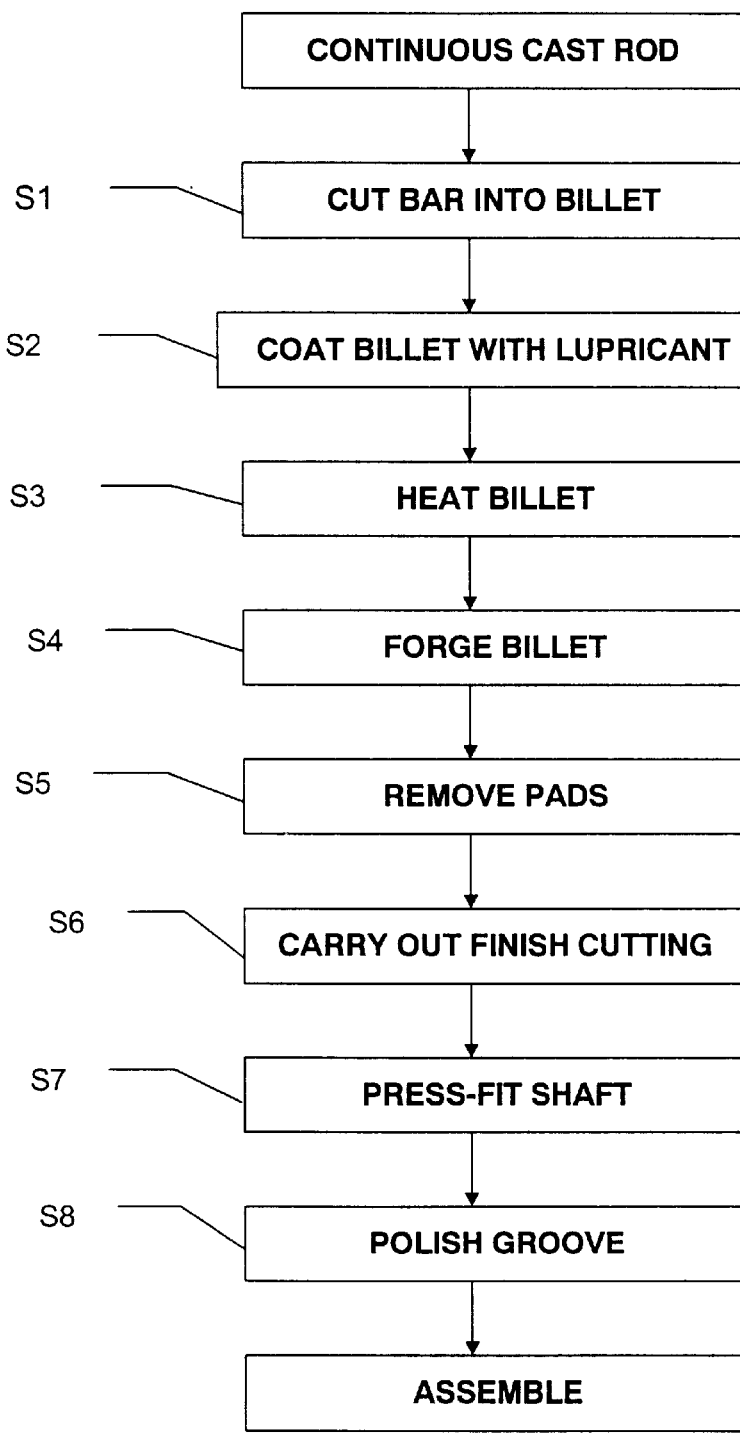
FIG. 5 is a flowchart showing a process of manufacturing a rotor.
Figure 5:
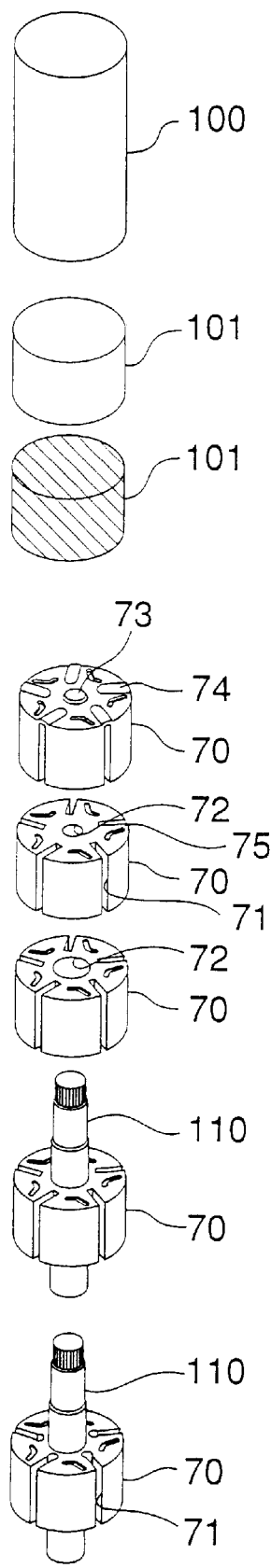
Figure 6:
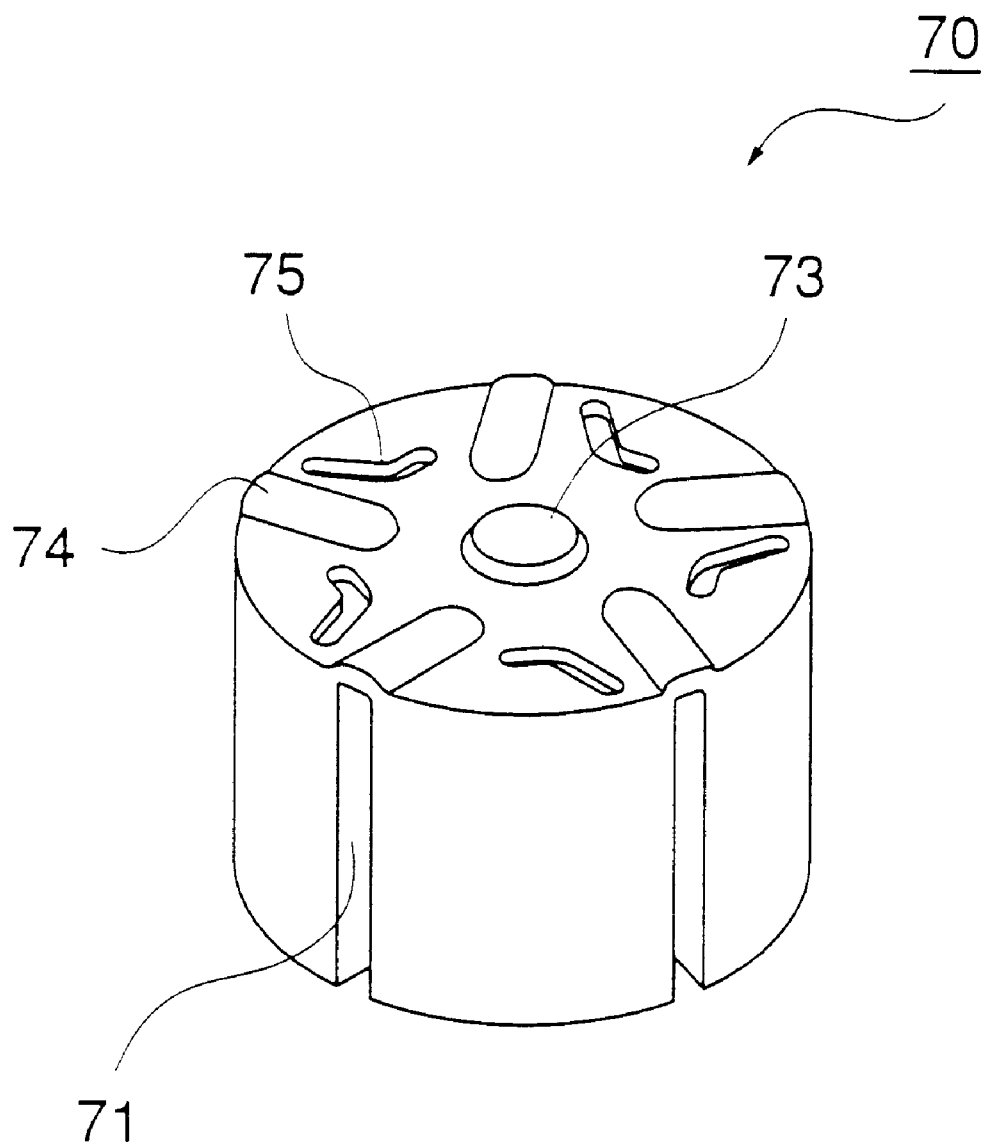
FIG. 6 is a perspective view of a completely forged rotor material.

Next, a process of manufacturing a rotor will be described with reference to FIGS. 5 and 6. S1 to S8 in FIG. 5 show respective manufacturing steps, and FIG. 6 shows a completely forged rotor material in perspective view.

The rotor material 70 is formed of a continuous cast rod 100 of an aluminum alloy containing 10 to 20 wt % of Si, 4 to 5 wt % of Cu, and 0.4 to 0.7 wt % of Mg.

First, at the step S1, the continuous cast rod 100 is out into a cylindrical billet 101 having a predetermined length.

Then, at the step S2, the billet 101 has surfaces thereof coated with a graphite-based lubricant to form coating thereon. The coating is provided so as to prevent the surfaces of the billet 101 from being burned due to friction between the dies and the billet 101 during forging of the billet 101.

At the following step S3, the billet 101 is heated to approximately 400° C.

The heated billet 101 is inserted into the lower die 20, and then, the upper punch 50 is lowered by the use of the press to apply a predetermined pressure (approximately 100 tons) to the billet 101.

After the billet 101 is shaped by cooperation of the upper punch 50, the lower die 20, the punch 80, and the lower punch 60 (step S4), the upper punch 50 is lifted upward.

As the upper punch 50 is lifted upward, the ejector pins 90 are accordingly extended upward to move the lower punch 60 upward, whereby the completely forged billet 101 or rotor material 70 (see FIG. 6) is ejected from the lower die 20.

At the step S5, the pads 73, 74 formed by the forging on the one end face of the rotor material 70 are out along a plane A (see FIG. 1) by the use of a lathe, etc., thereby forming the shaft hole 72 and the vane slits 71.

Further, at the step S6, an outer peripheral surface and the both end faces of the rotor material 70 as well as an inner peripheral surface of the shaft hole 72 are cut to predetermined dimensions.

Then, at the step S7, a shaft 110 is press-fitted into the shaft hole 72 of the rotor material 70.

The vane slits 71 and the outer peripheral surface and both end faces of the rotor material 70 are each polished at the step S8 to a predetermined surface roughness (approximately 1.5 to 1.6 $\mu$m).

It should be noted that in preforming the rotor material, it is possible to use a billet 101 of a smaller diameter and compress the same by upsetting in an axial direction such that it is formed to have a smaller length and a larger cross section.

According to the above embodiment, since the billet 101 fitted in the lower die 20 is shaped into the rotor material 70, it is possible to prevent the rotor material 70 from being distorted or warped. Therefore, additional machining conventionally required in the extrusion method to secure the perpendicularity of each vane slit with respect to the end faces of the rotor can be dispensed with, which enhances accuracy of finishing and contributes to reduction of manufacturing costs of the rotor at the same time. Further, effects of lubrication can be obtained for each product, which makes it possible to prevent the surface of the product from being flawed e.g. due to burning.

Further, since the shaft hole 72, the vane slits 71, and the oil grooves 75 can be formed simultaneously by one operation, it is not required to carry out any operations for making the shaft hole 72 by a drill or cutting the oil grooves after the rotor material 70 is shaped, so that it is possible to enhance the yield of the product by the shaping. In addition, since the rotor material 70 is not formed with any pads corresponding to the oil grooves 75, portions of the material which require cutting are decreased, and hence the yield of material can also be improved. These effects provided by the above embodiment contribute to reduction of the manufacturing costs of the rotor.

Still further, differently from a method of powder extrusion in which a material is shaped through longdistance extrusion, the method of the invention makes it possible to reduce friction between the dies and the material to prevent cracking of the material from occurring frequently, thereby increasing productivity.

Moreover, the method of the invention enables production of a rotor having a more homogeneous metal structure than a rotor produced by casting, which ensures a predetermined strength of the rotor.

Although the spring 92 is used as an urging member in the above embodiment, this is not limitative, but gas or a hydraulic cushion may be used.

Further, although in the embodiment, five ejector pins 90 are used in view of resistance of the rotor material 70 which the ejector pins 90 receive when they are projected upward, the number of the pins 90 is not limitative, either.

Moreover, the round ejector pins 90 employed in the embodiment may be replaced by ejector sleeves or the like. Further, the coil heater 150 may be replaced by any suitable heating means.

It is further understood by those skilled in the art that the foregoing is the preferred embodiment of the invention, and that various changes and modification may be made thereto without departing from the spirit and scope thereof.

What is claimed is:

1. A method of manufacturing a rotor for a vane compressor, comprising the steps of:

cutting a continuous cast rod into a billet having a predetermined length;

heating said billet and then fitting the same in a die assembly; and forming a plurality of vane slits and a shaft hole in said billet fitted in said die assembly, by the use of a press.

2. A method according to claim 1, wherein oil grooves are formed on both end faces of said billet simultaneously when said vane slits and said shaft hole are formed.

3. A method according to claim 1, wherein said billet has surfaces thereof coated with a lubricant after said billet is cut off from said continuous cast rod.

4. A method according to claim 1, wherein said billet is heated to approximately 400° C.

5. A method according to claim 4, wherein said die assembly is heated to approximately 200 to 300° C.

6. A method according to claim 4, wherein said continuous cast rod is made of aluminum alloy containing 10 to 20 wt % of Si, 4 to 5 wt % of Cu, and 0.4 to 0.7 wt % of Mg.

* * * * *